United States Patent [19]

Caruso

[11] Patent Number: 5,123,702
[45] Date of Patent: Jun. 23, 1992

[54] INTERACTION-HIGH DENSITY STACKING CHAIR
[75] Inventor: Jerome C. Caruso, Lake Forest, Ill.
[73] Assignee: Shelby Williams Industries, Inc., Chicago, Ill.
[21] Appl. No.: 602,508
[22] Filed: Oct. 24, 1990
[51] Int. Cl.⁵ .............................................. A47C 1/02
[52] U.S. Cl. ................... 297/342; 297/457; 297/459; 297/460; 297/416; 297/446; 297/DIG. 2; 297/239; 403/188
[58] Field of Search ......... 297/457, 459, 460, DIG. 2, 297/342, 411, 416, 239, 444, 446–448, 420, 421; 403/188, 245, 407.1

[56]  References Cited
U.S. PATENT DOCUMENTS

| | | | |
|---|---|---|---|
| 349,063 | 9/1886 | Shepard | 297/342 |
| 3,278,227 | 10/1966 | Rowland | 297/239 |
| 3,431,022 | 5/1967 | Poppe et al. | 297/445 |
| 3,459,449 | 8/1969 | Klausen | 297/239 |
| 3,583,759 | 6/1971 | Kramer | 297/451 |
| 3,610,686 | 10/1971 | Caruso | 297/239 |
| 3,734,561 | 5/1973 | Barecki et al. | 297/457 X |
| 3,883,176 | 5/1975 | Morton | 297/457 |
| 4,418,958 | 12/1983 | Watkin | 297/457 |
| 4,452,486 | 6/1984 | Zapf et al. | 297/341 X |
| 4,522,444 | 6/1985 | Pollock | 297/239 |
| 4,962,964 | 10/1990 | Suodgrass | 297/457 |

Primary Examiner—Joseph Falk
Assistant Examiner—Milton Nelson, Jr.
Attorney, Agent, or Firm—Silverman, Cass & Singer, Ltd.

[57] ABSTRACT

A high density stacking chair having a unique construction permits interaction between a frame member and a chair shell. The frame member is formed of a unitary construction, and the chair shell is formed of a singled piece of molded plastic material. The chair shell includes a seat portion and a back portion joined integrally to the seat portion and extends upwardly therefrom. Fastening members are provided for securing the support straps joined to the frame member to the seat portion of the chair shell. Locking devices are provided for securing the support straps to the back portion of the chair shell. The locking devices define pivot points about which the back portion rotate outwardly when the seat portion of the chair shell is deflected forwardly and the back portion of the chair shell is deflected rearwardly so as to force outwardly under stress the frame member. The frame member including front and rear leg portions resiliently urge the chair shell back to its original position when the outward force is removed.

15 Claims, 2 Drawing Sheets

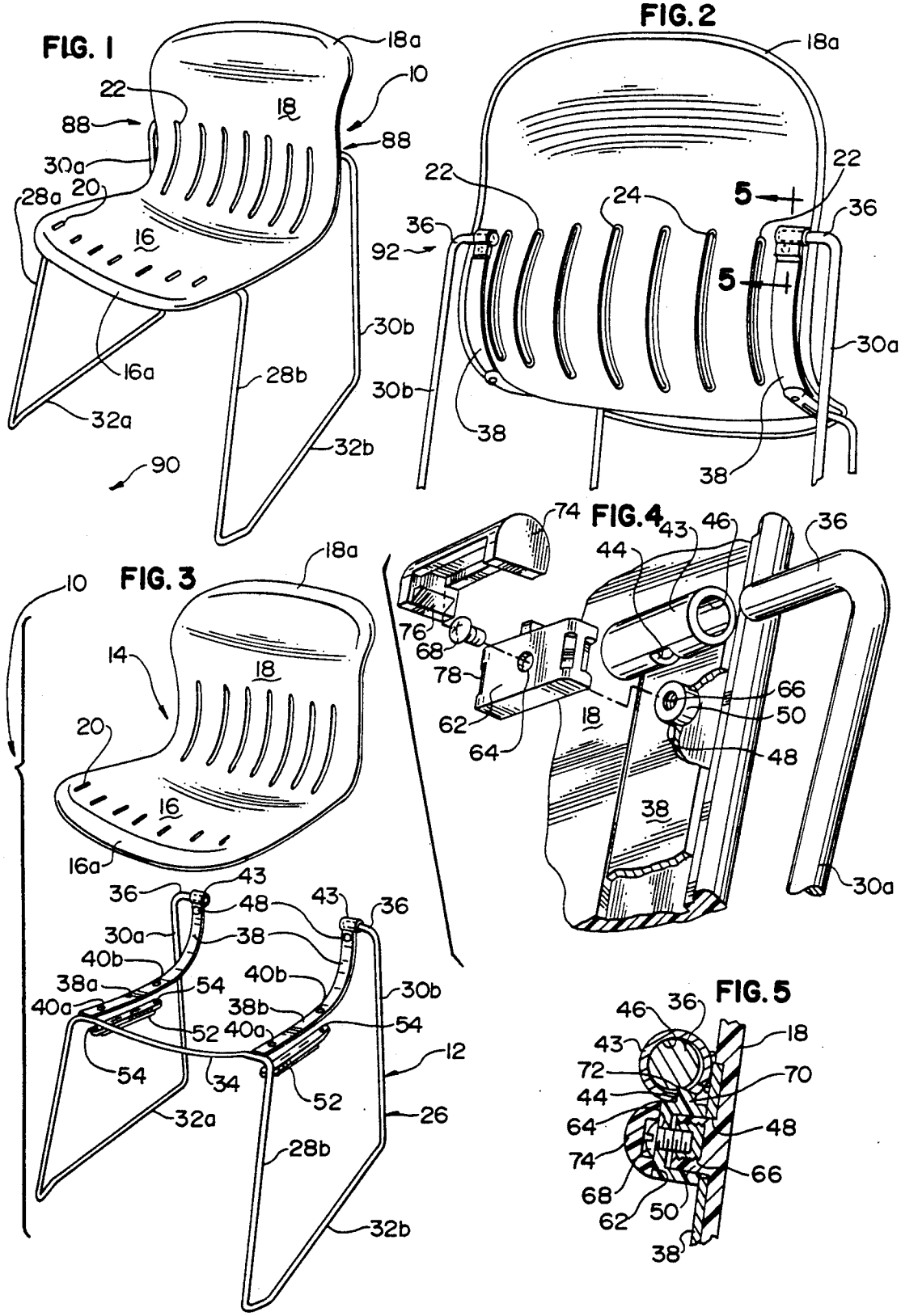

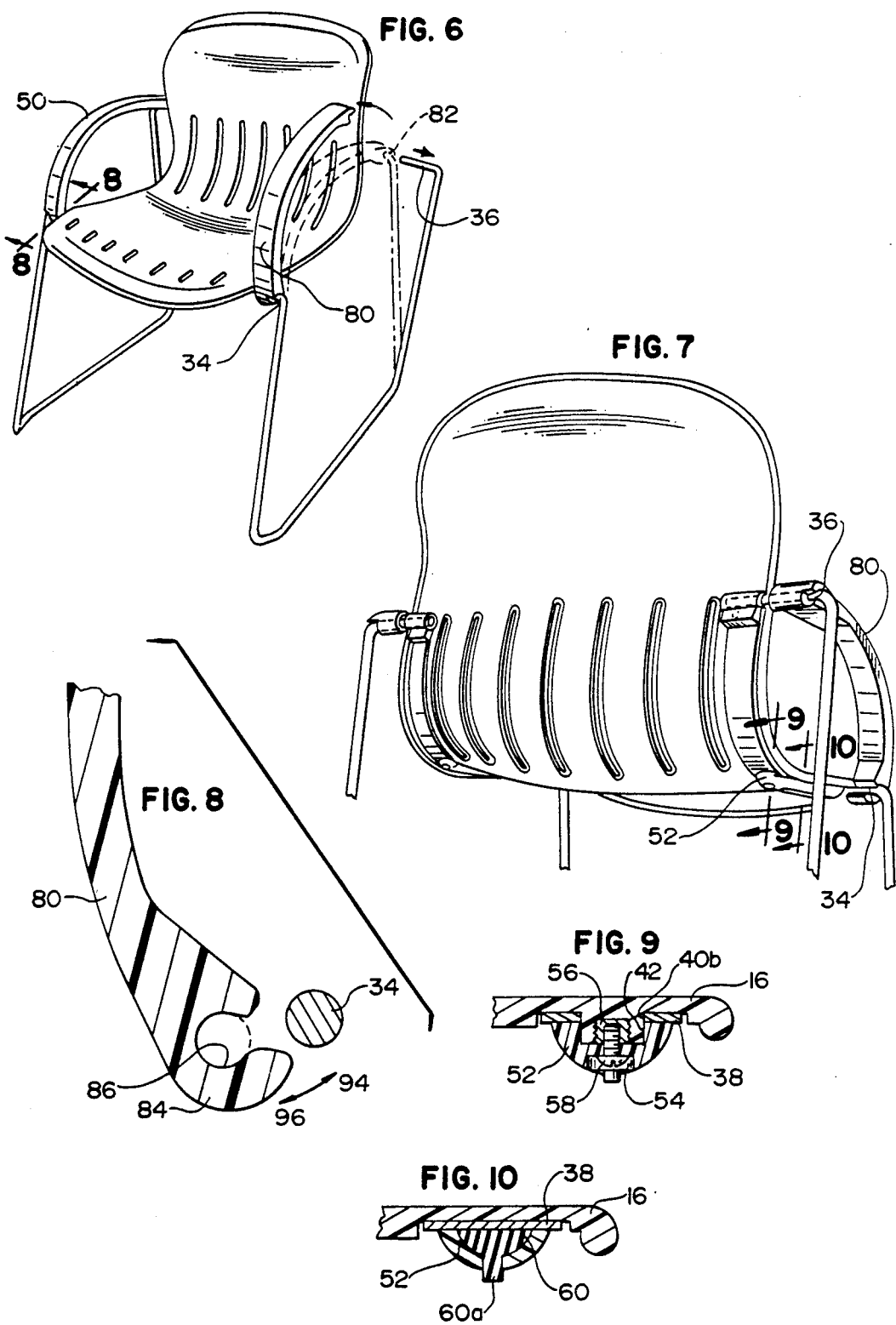

INTERACTION-HIGH DENSITY STACKING CHAIR

This invention relates generally to chair constructions and, more particularly, it relates to a high density stacking chair which has a unique construction so as to allow interaction between a frame assembly and a separate chair shell.

BACKGROUND OF THE INVENTION

As is well known in the prior art of chair manufacturing, there are various ways to fixedly secure a molded, one piece plastic seat shell to a frame assembly made of steel, wood, plastic or the like. Such prior art chair constructions are exemplified in U.S. Pat. Nos. 3,431,022; 3,459,449; 3,583,759; 3,610,686; and 3,883,176.

In U.S. Pat. No. 3,431,022 to Robert P. Poppe et al. issued on Mar. 4, 1969, there is disclosed a chair construction of the type having a seat portion and a frame including a rail portion disposed adjacent each of a pair of opposite edges of the seat portion. Co-operative means are formed along opposite edges of the seat portion and along the rail portion adjacent each such edge producing a dovetail joint therebetween. The seat portion is assembled to the rail portions by relative sliding of such dovetail joints. In U.S. Pat. No. 3,459,449 to Leo H. Klausen issued on Aug. 5, 1969, there is shown a one-piece molded stacking chair which permits close and efficient stacking of such chairs without the need of reinforcing elements. In U.S. Pat. No. 3,583,759 to Gideon A. Kramer issued on June 8, 1971, there is disclosed an L-shaped, molded plastic shell which is formed of a seat portion and a back portion integrally joined thereto by a flexible concavoconvex waist portion.

U.S. Pat. No. 3,610,686 to Jerome C. Caruso issued on Oct. 5, 1971, teaches a chair which is capable of being stacked for storage and releasably coupled or ganged in side-by-side relation forming a row of like chairs. The chair includes a separate seat assembly and a base assembly. The seat assembly includes a pair of identical, L-shaped frame members between which are mounted a backrest and a seat. The base assembly includes two identical leg units, each having a pair of front or rear legs with shoulder portions to which the ends of a cross member are joined. The leg units are fastened together along inner faces of the cross members so as to form the base assembly. The seat assembly is secured to the base assembly by a mortise and tenon joint. U.S. Pat. No. 3,883,167 to Philip H. Morton issued on May 13, 1975, teaches a one-piece chair shell including a seat portion and a backrest portion connected by a vertically corrugated integral connection section.

However, none of these prior art patents discussed above discloses a high density stacking chair like that of the present invention which allows an interaction between a frame assembly and a separate chair shell. Specifically, when a person seated normally erect in the chair tends to lean back and straighten his legs with respect to his back, the forward edge of the chair shell is deflected forwardly and the upper back portion of the shell is deflected rearwardly so as to "open up" the shell. When the person leans forward back to the neutral or normal erect position, the frame assembly provides a return spring force which forces the chair shell back to its original "at rest" position.

SUMMARY OF THE INVENTION

Accordingly, it is a general object of the present invention to provide an interaction-high density stacking chair of a unique construction which is relatively simple and economical to manufacture and assemble.

It is an object of the present invention to provide a high density stacking chair which has a unique construction so as to allow interaction between a frame assembly and a separate chair shell.

It is another object of the present invention to provide an improved chair construction wherein the chair can be stacked in high density or ganged together, with or without armrests, and is formed of a minimum number of components.

It is still another object of the present invention to provide a high density stacking chair formed of a frame assembly and a separate chair or shell in which the frame assembly provides a return spring force which forces the chair shell back to its original "at rest" position after the chair shell has been deflected to the open position.

In accordance with these aims and objectives, the present invention is concerned with the provision of an interaction-high density stacking chair which includes a frame member being formed of a unitary construction and a chair shell formed of a single piece of molded plastic material. The frame member consists of a pair of front leg portions, a pair of parallel spaced-apart base members, and a pair of rear leg portions joined integrally to the pair of front leg portions by the pair of base members. The front leg potions have their upper ends joined together by a horizontal cross-member. The rear leg portions have their upper free ends terminating in connecting members. A pair of L-shaped supporting straps have their one ends joined to the cross-member of the frame member and their other ends joined to the connecting members of the frame member. The chair shell includes a seat portion and a back portion joined integrally to the seat portion and extends upwardly therefrom.

A fastening device secures the support straps to the seat portion of the chair shell. A locking device secures the support straps to the back portion of the chair shell. The locking device defines pivot points about which the back portion rotates outwardly when the seat portion of the chair shell is deflected forwardly and the back portion of the chair shell is deflected rearwardly so as to force outwardly under stress the front and rear leg portions of the frame member. The front and rear leg portions of the frame member resiliently urge the chair shell back to its original position when the outward force is removed.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a perspective view of a high density stacking chair, constructed in accordance with the principles of the present invention;

FIG. 2 is a perspective view of the upper back portion of the cover shell of the stacking chair;

FIG. 3 is an exploded perspective view of the stacking chair of FIG. 1;

FIG. 4 is an enlarged fragmentary view of the locking mechanism of FIG. 2 for securing the support straps to the back of the chair shell;

FIG. 5 is a fragmentary sectional view, taken along the lines 5—5 of FIG. 2;

FIG. 6 is a perspective view similar to FIG. 1, but illustrating the armrests being attached to the frame assembly;

FIG. 7 is a perspective view similar to FIG. 2, but illustrating the fastening device for securing the support straps to the seat portion of the chair shell;

FIG. 8 is a fragmentary sectional view, taken along the lines 8—8 of FIG. 6 and illustrating the connection of the front portion of the armrest to the horizontal cross-member of the frame assembly;

FIG. 9 is a fragmentary sectional view, taken along the lines 9—9 of FIG. 7; and FIG. 10 is a fragmentary sectional view, taken along the lines 10—10 of FIG. 7.

DESCRIPTION OF THE PREFERRED EMBODIMENT

Referring now in detail to the various views of the drawings, there is shown in FIGS. 1-3 an interaction-high density stacking chair 10 which is constructed in accordance with the principles of the present invention. The stacking chair 10 is formed of a frame assembly 12 and a one-piece molded chair shell 14 which is mounted upon the frame assembly 12. The stacking chair 10 permits an interaction between the frame assembly 12 and the chair shell 14 so that when a user leans back in the chair the chair shell "opens up" and when the user leans forward the frame assembly forces the chair shell to spring back to its original position. The stacking chair is especially suitable for use in offices, restaurants, auditoriums, churches, schools and other like facilities. The staking chair of the present invention provides exceptional comfort and is capable of high density stacking or being ganged together in long rows. Further, the stacking chair is economical to manufacture and is capable of being constructed, with or without armrests, without requiring a modification to the basic structure.

The chair shell 14 is preferably made of a material having an inherent resiliency, such as copolymer polypropylene or resin bonded glass fiber, which can be easily manufactured by an injection molding process. The type of material and its thickness determines its structural strength and resiliency of the chair shell. However, it is preferable to form the shell with an increased wall thickness along the periphery to provide added structural strength and support and with a reduced wall thickness in its central portion to give flexibility and comfort. The chair shell includes a generally concave horizontal seat portion 16 and a generally concave back portion 18 formed integrally with the seat portion 16 and extending upwardly therefrom. In order to provide ventilation or air circulation for the user, there are formed a plurality of narrow slots 20 in the front section of the seat portion 16 and a plurality of elongated arcuate slots 22 in the lower section of the back portion 18.

The upper free edge 18a of the back portion may be flared outwardly to provide a comfortable edge to the back portion. Similarly, the forward free edge 16a of the seat portion may be flared downwardly to provide a comfortable edge to the seat portion. Further, ribs 24 may be formed adjacent the slots 22 in the lower section on the back surface of the back portion 18 so as to add stiffness or to strengthen the lower section, thereby permitting the shell to bend or flex more easily at the lumbar area of the user's back.

The frame assembly 12 includes a frame member 26 which is formed or bent from a single piece of cold rolled metal wire, such as steel and the like. The frame member 26 consists of a pair of front leg portions 28a, 28b and a pair of rear leg portions 30a, 30b which are joined integrally to the front leg portions by a pair of generally parallel spaced-apart base members 32a, 32b. The upper ends of the respective front leg portions 28a, 28b are joined together by a horizontal cross-member 34. Each of the upper free ends of the rear leg portions 30a, 30b terminate in a short horizontally extending connecting member 36.

The frame assembly 12 also includes a pair of generally L-shaped shell support straps 38 formed preferably of a flat cold rolled resilient metal, such as steel and the like. The long legs of the L-shaped support straps define a pair of generally horizontal rail portions 38a, 38b for supporting the outer bottom surfaces of the seat portion 16 of the shell. Each of the rail portions is provided with a pair of openings 40a, 40b adapted for receiving bosses 42 (two per side) formed on the bottom surfaces of the seat portion 16 of the shell. Each of the upper ends of the short legs of the L-shaped straps 38 has welded thereto a round, hollow receiving member 43 (FIG. 4) which has a slit 44 formed therein. The receiving member 42 includes a blind hole 46 of an appropriate diameter for receiving the connecting member 36 of the rear leg portion 30a with a forcefit. Adjacent the upper ends of short legs of the straps, there are provided openings 48 for receiving bosses 50 (one on each side) formed on the outer back surfaces of the back portion of the shell. The free ends of the long legs 38a, 38b of the straps are welded to the respective ends of the horizontal cross-member 34.

As can best be seen from FIGS. 3, 7, 9 and 10, a pair of elongated trough-like fastening members 52 are provided for securing the seat portion 16 of the shell to the straps 38 of the frame assembly 12. The ends of the fastening members 52 are provided with recesses 54 which are aligned to receive the seat bosses 42 extending through the openings 40a, 40b and the support strap 38. The seat boss 42 (one of them is shown in FIG. 9) extending through the opening 40b in the support strap 38 has an internally threaded insert 56 which receives a machine screw 58 extending through the recess 54 in the fastening member 52. As can be seen in FIG. 10, an insert 60 formed preferably of an elastomeric material such as rubber is installed in the fastening member 52 with a part 60a thereof protruding below the fastening member 52. When the chairs of the present invention are stacked, the part 60a defining a spacer will rest upon the top surface of the long leg of the support strap on the next lower chair so as to provide non-skid stacking and non-damaging rubber-to-metal contact.

In FIGS. 2, 4 and 5, there is illustrated a generally rectangular locking device 62 which is preferably formed of a molded plastic material for securing both sides of the back portion 18 of the shell to the frame assembly 12. Each of the locking devices 62 is provided with a central recess 64 which receives the boss 50 extending through the opening 48 in the support strap 38. The boss 50 passing through the opening 48 in the strap 38 (one of them is shown in FIGS. 4 and 5) has an internally threaded insert 66 which receives a machine screw 68 extending through the recess 64 in the locking mechanism 62. The locking device 62 has a projection or key 70 which is inserted through the slit 44 in the receiving member 42 and into a slot 72 formed in the connecting member 36 so as to prevent the connecting members 36 of the rear leg portions 30a, 30b of the frame member from sliding out of the receiving member 43. A hollow semi-cylindrical cover member 74 also preferably formed of a molded of plastic material is provided to conceal the locking device 62 so as to produce an attractive appearance. The cover member 74 is formed with co-mating projections 76 which are adapted to snap-fit into corresponding opening 78 formed in the locking device 62 so as to fixedly secure the same. The fully assembled stacking chair 10 is shown in FIGS. 1 and 2.

The manner of assembling the stacking chair construction of the present invention is likely to be already apparent. As previously pointed out, the ends of the long legs of the support strap 38 are welded to the ends of the horizontal cross-member 34, and the pair of connecting members 36 are inserted into the respective receiving members 43 so as to form the frame assembly as shown in FIG. 3. The chair shell bosses 42 and 50 are then inserted into the corresponding openings 40a, 40b and 48 in the support straps 38. Next, the machine screws 58 are passed through the openings 54 in the fastening member 52 and the openings 40a, 40b and the support straps 38 and threaded into the inserts 56 formed in the bosses 42 of the seat portion 16. The locking devices 62 are installed so that their central apertures 64 are aligned with the bosses 50 on the back portion 18 of the shell and their projections 70 are inserted through the corresponding slots 44 in the receiving members 43 and into the slits 72 of the connecting members 36. Then, the machine screws 68 are passed through the central recesses 64 in the locking devices and threaded into the inserts 66 formed in the bosses 50 of the back portion 18 of the shell. Finally, the cover members 74 are snap fitted over the locking devices 62.

Using the basic construction as described above, the distal ends of the horizontal cross-member 34 and portions of the connecting members 36 of the frame assembly may be used to support armrests 80 as shown in FIGS. 6 and 7. The armrests 80 are preferably made of a material having an inherent resiliency such as copolymer polypropylene, which can be easily manufactured by injection molding. The support armrests are generally arcuate in shape and are formed with openings 82 in its rear portion through which the connecting members 36 are passed through before subsequent assembly. As can best be seen from FIG. 8, the front portion of the armrests 80 is provided with an arcuate projecting member 84 having an opening 86 in which the distal ends of the cross-member 34 can be passed through so as to maintain a snap fit. It should be noted that the frame assembly is disposed outwardly of both the shell and armrests, thereby facilitating ganging in long rows.

Referring now again to FIG. 1, the interaction of the present chair construction, without arms, with the user will be explained. When a person is seated normally erect in the chair leans back and straightens his legs with respect to his back, the back portion of the shell 14 is rotated outwardly at pivot points 88 about the frame assembly 12 so that the forward edge 16a of the seat portion 16 of the shell is deflected forwardly and the upper back portion 18 of the shell is deflected rearwardly for opening up the shell. As a result, the front leg portions 28a, 28b and the rear leg portions 30a, 30b are forced under stresses in the direction of respective arrows 90, 92.

When the person leans forward back to the neutral or normal erect position, the front leg portions 28a, 28b and the rear leg portions 30a, 30b of the frame member 26 provide a return spring force in the directions opposite to the arrows 90, 92 so as to resiliently urge the chair shell 14 back to its original "at rest" position. When the armrests 80 are attached to the frame assembly 12, as shown in FIG. 6, it should be apparent to those skilled in the art that the front portion of the armrest is free to rotate on the cross-member 34. As illustrated in FIG. 8, a small amount of this rotation occurs either in the direction of the arrow 94 or 96 when the person leans back or sits forward in the erect position.

From the foregoing detailed description, it can thus be seen that the present invention provides a high density stacking chair which has a unique construction so as to allow interaction between a frame assembly and a separate chair shell. The stacking chair of the present invention includes a frame member formed of a unitary construction and a chair shell formed of a single piece of molded plastic material.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An interaction-high density stacking chair comprising:

a frame member being formed of a unitary construction, said frame member consisting of a pair of front leg portions having upper ends and opposite lower ends, a pair of parallel spaced-apart base members, and a pair of rear leg portions having upper free ends and opposite lower ends, said lower ends of said rear leg portions being joined integrally to said lower ends of said front leg portions by said pair of base members, said front leg portions having their upper ends joined together by a horizontal cross-member, said rear leg portions having their upper free ends terminating in connecting members;

a pair of L-shaped support straps having opposing ends, each strap having one end joined to said cross-member of said frame member and an opposite end joined to said connecting members of said frame member;

a chair shell formed of a single piece of molded plastic material and including a seat portion and a back portion joined integrally to said seat portion and extending upwardly therefrom.

fastening means for securing said support straps to said seat portion of the chair shell;

locking means for securing said support straps to said back portion of the chair shell;

said locking means defining pivot points about which said back portion rotates outwardly when the seat portion of the chair shell is deflected forwardly and the back portion of the chair shell is deflected rearwardly so as to force outwardly under stress said upper ends of each of said front and rear leg portions of said frame member; and said front and rear leg portions of said frame member resiliently urging said chair shell back to its original position when the outward force is removed.

2. An interaction-high density stacking chair as claimed in claim 1, wherein a front section of said seat portion is comprised of a plurality of narrow slots to provide ventilation or air circulation to the user.

3. An interaction-high density stacking chair as claimed in claim 2, wherein a lower section of said back portion is comprised of a plurality of elongated slots to provide ventilation or air circulation to the user.

4. An interaction-high density stacking chair as claimed in claim 3, further comprising ribs formed adjacent said elongated slots in the lower section of said back portion so as to add stiffness thereto.

5. An interaction-high density stacking chair comprising:

a frame member being formed of a unitary construction, said frame member consisting of a pair of front leg portions having upper ends and opposite lower ends, a pair of parallel spaced-apart base members, and a pair of rear leg portions having upper free ends and opposite lower ends, said lower ends of said rear leg portions being joined integrally to said lower ends of said front leg portions by said pair of base members, said front leg portions having their upper ends joined together by a horizontal cross-member, said rear leg portions having their upper free ends terminating in connecting members;

a pair of L-shaped support straps having opposing ends, each strap having one end joined to said cross-member of said frame member and an opposite end joined to said connecting members of said frame member;

a chair shell formed of a single piece of molded plastic material and including a seat portion and a back portion joined integrally to said seat portion and extending upwardly therefrom;

fastening means for securing said support straps to said seat portion of the chair shell;

locking means for securing said support straps to said back portion of the chair shell;

a pair of armrests, each armrest being joined between said connecting members and said cross-member;

said locking means defining pivot points about which said back portion rotates outwardly when the seat portion of the chair shell is deflected forwardly and the back portion of the chair shell is deflected rearwardly so as to force outwardly under stress said upper ends of each of said front and rear leg portions of said frame member;

said front and rear leg portions of said frame member resiliently urging said chair shell back to its original position when the outward force is removed; and bosses having integrally threaded inserts formed in said seat portion and said back portion of said chair shell for receipt in corresponding openings formed in said L-shaped support straps.

6. An interaction-high density stacking chair as claimed in claim 5, wherein each of said armrests has an arcuate projecting member having an opening for receiving said cross-member in a snap fit.

7. An interaction-high density stacking chair as claimed in claim 5, wherein said fastening means comprises a pair of elongated trough-like fastener members having end recesses for receiving the bosses formed in said seat portion and extending through openings formed in said support straps.

8. An interaction-high density stacking chair as claimed in claim 7, further comprising an insert formed of an elastomeric material and being disposed in said fastening member, a part of said insert protruding below said fastening member and defining a spacer to provide a non-skid surface during stacking.

9. An interaction-high density stacking chair as claimed in claim 5, wherein said locking means comprises round hollow receiving members formed on said other ends of said support straps for receipt of said connecting members of said frame member and a locking device having a projection insertable through a slot formed in said receiving members and into a slot formed in said connecting members to prevent sliding movement of said connecting members.

10. An interaction-high density stacking chair as claimed in claim 9, further comprising a cover member which is placed over said locking device to conceal it and thus rendering an attractive appearance.

11. An interaction-high density stacking chair comprising:

a frame member being formed of a unitary construction, said frame member consisting of a pair of front leg portions having upper ends and opposite lower ends, a pair of parallel spaced-apart base members, and a pair of rear leg portions having upper free ends and opposite lower ends, said lower ends of said rear leg portions being joined integrally to said lower ends of said front leg portions by said pair of base members, said front leg portions having their upper ends joined together by a horizontal cross-member, said rear leg portions having their upper free ends terminating in connecting members;

a pair of L-shaped support straps having opposing ends, each strap having one end joined to said cross-member of said frame member and opposite end joined to said connecting members of said frame member;

a chair shell formed of a single piece of molded plastic material and including a seat portion and a back portion joined integrally to said seat portion and extending upwardly therefrom;

fastening means for securing said support straps to said seat portion of the chair shell;

locking means for securing said support straps to said back portion of the chair shell;

said locking means defining pivot points about which said back portion rotates outwardly when the seat portion of the chair shell is deflected forwardly and the back portion of the chair shell is deflected rearwardly so as to force outwardly under stress said upper ends of each of said front and rear leg portions of said frame member;

said front and rear leg portions of said frame member resiliently urging said chair shell back to its original position when the outward force is removed; and bosses having internally threaded inserts formed in said seat portion and said back portion of said chair shell for receipt in corresponding openings formed in said L-shaped support straps.

12. An interaction-high density stacking chair as claimed in claim 11, wherein said fastening means comprises a pair of elongated trough-like fastener members having end recesses for receiving the bosses formed in said seat portion and extending through openings formed in said support straps.

13. An interaction-high density stacking chair as claimed in claim 12, further comprising an insert formed of an elastomeric material and being disposed in said fastening member, a part of said insert protruding below said fastening member and defining a spacer to provide a non-skid surface during stacking.

14. An interaction-high density stacking chair as claimed in claim 11, wherein said locking means comprises round hollow receiving members formed on said other ends of said support straps for receipt of said connecting members of said frame member and a locking device having a projection insertable through a slot formed in said receiving members and into a slot formed in said connecting members to prevent sliding movement of said connecting members.

15. An interaction-high density stacking chair as claimed in claim 14, further comprising a cover member which is placed over said locking device to conceal it and thus rendering an attractive appearance.

* * * * *